(12) United States Patent
Das et al.

(10) Patent No.: US 7,940,656 B2
(45) Date of Patent: *May 10, 2011

(54) SYSTEM AND METHOD FOR AUTHENTICATING AN ELEMENT IN A NETWORK ENVIRONMENT

(75) Inventors: Amitava Das, Chapel Hill, NC (US);
Michael A. Wright, Cary, NC (US);
Joseph A. Salowey, Seattle, WA (US);
William C. Gossman, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 620 days.

This patent is subject to a terminal disclaimer.

(21) Appl. No.: 11/949,157

(22) Filed: Dec. 3, 2007

(65) Prior Publication Data

US 2008/0081592 A1  Apr. 3, 2008

Related U.S. Application Data

(63) Continuation of application No. 10/322,128, filed on Dec. 17, 2002, now Pat. No. 7,310,307.

(51) Int. Cl.
*H04J 3/12* (2006.01)
*H04L 12/66* (2006.01)
*H04W 4/00* (2009.01)

(52) U.S. Cl. ......... 370/229; 370/338; 370/352; 455/433

(58) Field of Classification Search .................. None
See application file for complete search history.

(56) References Cited

U.S. PATENT DOCUMENTS

| | | | | |
|---|---|---|---|---|
| 5,862,481 | A | 1/1999 | Kulkarni et al. | 455/432 |
| 5,867,787 | A | 2/1999 | Vudali et al. | 455/445 |
| 5,905,736 | A | 5/1999 | Ronen et al. | 370/546 |
| 5,956,391 | A | 9/1999 | Melen et al. | 379/114 |
| 5,970,477 | A | 10/1999 | Roden | 705/32 |
| 6,047,051 | A | 4/2000 | Ginzboorg et al. | 379/130 |
| 6,101,380 | A | 8/2000 | Sollee | 455/411 |
| 6,169,892 | B1 | 1/2001 | Sollee | 455/411 |
| 6,230,012 | B1 | 5/2001 | Wilkie et al. | 455/435 |
| 6,353,621 | B1 | 3/2002 | Boland et al. | 370/467 |
| 7,062,253 | B2 * | 6/2006 | Money et al. | 455/406 |
| 7,116,970 | B2 | 10/2006 | Brusilovsky et al. | 455/411 |
| 2002/0059114 | A1 | 5/2002 | Cockrill et al. | 705/27 |
| 2003/0235175 | A1 | 12/2003 | Naghian et al. | 370/338 |
| 2003/0235305 | A1 | 12/2003 | Hsu | 380/247 |
| 2004/0066769 | A1 | 4/2004 | Ahmavaara et al. | 370/338 |

FOREIGN PATENT DOCUMENTS

| | | |
|---|---|---|
| WO | WO 98/26381 | 12/1997 |
| WO | WO 99/31610 | 12/1998 |

* cited by examiner

*Primary Examiner* — Chi H Pham
*Assistant Examiner* — Soon-Dong D Hyun
(74) *Attorney, Agent, or Firm* — Baker Botts L.L.P.

(57) ABSTRACT

A method for authenticating an element in a network environment is provided that includes receiving a request for one or more triplets. One or more of the triplets may be associated with an authentication communications protocol that may be executed in order to facilitate a communication session. The method further includes returning one or more of the triplets in response to the request and initiating the communication session in response to the triplets after proper authentication of an entity associated with the request.

16 Claims, 2 Drawing Sheets

SYSTEM AND METHOD FOR AUTHENTICATING AN ELEMENT IN A NETWORK ENVIRONMENT

CROSS-REFERENCE TO RELATED APPLICATION

This application is a continuation of U.S. application Ser. No. 10/322,128 filed Dec. 17, 2002 and entitled "System and Method for Authenticating an Element in a Network Environment".

TECHNICAL FIELD OF THE INVENTION

This invention relates in general to the field of communications and more particularly to a system and method for authenticating an element in a network environment.

BACKGROUND OF THE INVENTION

The field of communications has become increasingly important in today's society. One area of importance associated with network communications relates to authentication. Authentication protocols may be used in order to properly verify the identities of end users or objects that communicate in a network environment. The proliferation of wireless local area networks (WLANs) have further complicated authentication protocols and provided significantly more traffic for devices and components in communication systems and architectures.

In executing authentication procedures and processes, it is important to minimize bottlenecks, impedances, and other points of congestion caused by increased access requests and responses that are propagating via suitable communication links. Excessive traffic may overburden components and elements in a network architecture and deteriorate system performance because of the inability to accommodate such communication demands. Thus, the ability to provide for effective authentication without inhibiting system speed or system performance presents a significant challenge to network designers and communication system operators.

SUMMARY OF THE INVENTION

From the foregoing, it may be appreciated by those skilled in the art that a need has arisen for an improved communications approach that provides the capability for devices or components to properly authenticate selected end users or devices. In accordance with one embodiment of the present invention, a system and method for authenticating an element in a network environment are provided that substantially eliminate or greatly reduce disadvantages and problems associated with conventional authentication techniques.

According to one embodiment of the present invention, there is provided a method for authenticating an element in a network environment that includes receiving a request for one or more triplets. One or more of the triplets may be associated with an authentication communications protocol that may be executed in order to facilitate a communication session. The method further includes returning one or more of the triplets in response to the request and initiating the communication session in response to the triplets after proper authentication of an entity associated with the request.

Certain embodiments of the present invention may provide a number of technical advantages. For example, according to one embodiment of the present invention a communications approach is provided that offers distributed caching for authentication protocols in a network environment. The caching operation may be executed by multiple components within a corresponding communication architecture, including an authorization, authentication, and accounting (AAA) server or a mobile application part (MAP) gateway for example. Each of these elements may include a cache table that operates to store triplets that may be used (or reused) by an end user or a device seeking to authenticate via a network in order to facilitate a communication session. The ability to cache triplets at remote locations, without having to access an authentication center included in a home location register (HLR), provides an enhanced network configuration that is faster and that produces less traffic for elements or components implicated in the authentication process. The enhancement in propagation speeds of communication requests and responses is a result of the ability to cache triplets locally instead of burdening the HLR for each authentication request. When a request propagates through an AAA server and through a MAP gateway, significant traffic develops as the request must travel a substantial distance and implicate several components in order to retrieve triplets necessary for the authentication of a communication session. However, with the use of a distributed caching protocol, this problem is resolved by allowing multiple network components to provide a requisite number of triplets to an end user or object.

Another technical advantage associated with one embodiment of the present invention is also a result of the caching configuration employed by the present invention. Because the HLR is not necessarily implicated in each authentication request, the HLR may accommodate additional bandwidth and traffic associated with other components or devices. Thus, by allocating resources properly, a network configuration is provided that offers the ability to relieve points of congestion across multiple elements in the network. For example, an AAA server and a MAP gateway may be used to lessen the workload placed on the HLR that would otherwise be required to authenticate each end user or object seeking to initiate a communication session. This additionally provides increased flexibility and scalability to an associated network and may be applicable to any internet protocol (IP) communications where identification elements are used to effectuate authentication protocols. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
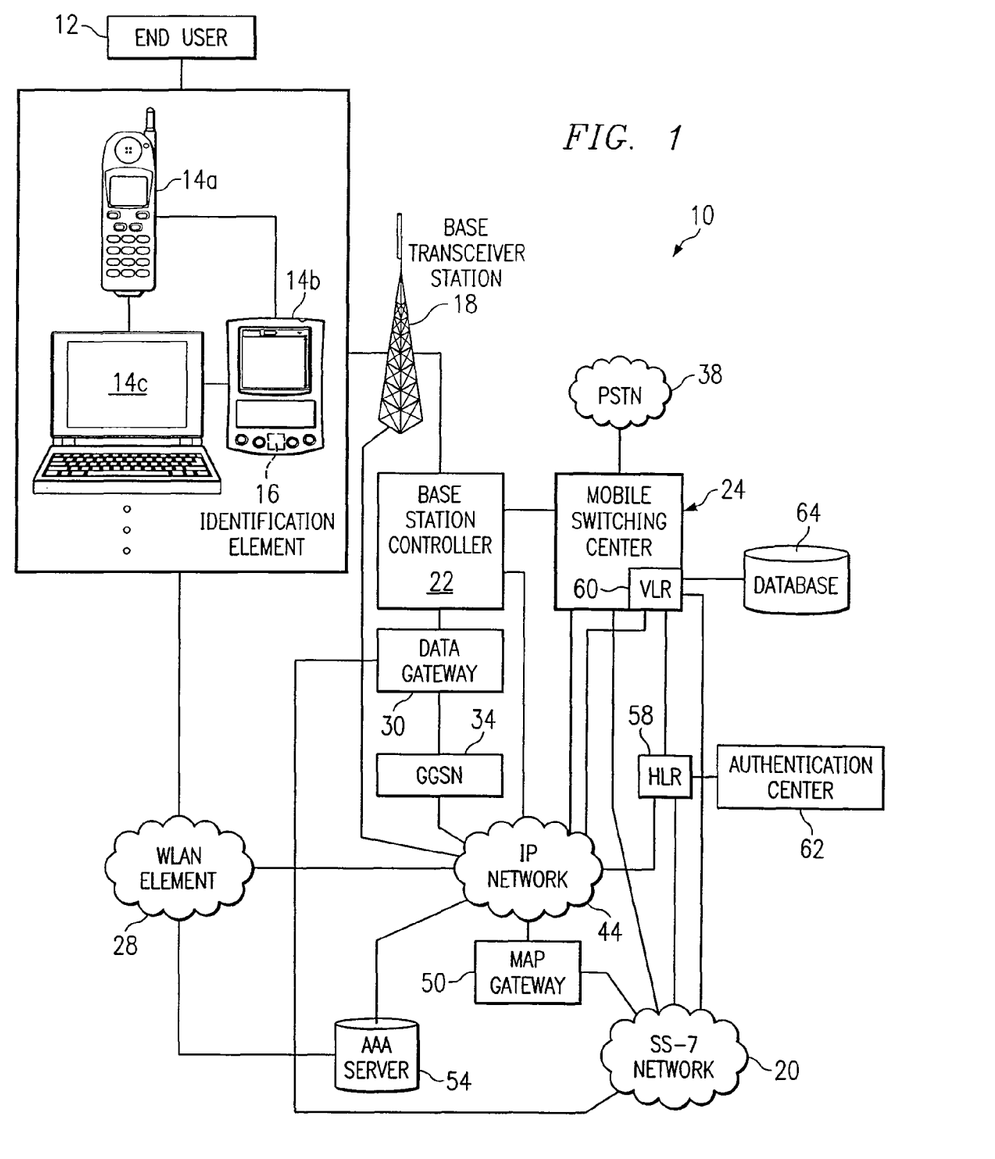
FIG. 1 is a simplified block diagram of a communication system for providing authentication in a network environment in accordance with one embodiment of the present invention.

FIG. 1 is a simplified block diagram of a communication system 10 for authenticating an end user 12 (or an element associated therewith) in accordance with one embodiment of the present invention. Communication system 10 includes end user 12, an example set of communication elements that includes a mobile station 14a, a personal digital assistant (PDA) 14b, and a laptop 14c (any one of which may include an identification element 16), a base transceiver station 18, an SS-7 network 20, a base station controller 22, and a mobile switching center 24. Communication system 10 also includes a wireless local area network (WLAN) element 28, a data gateway 30, a gateway general packet radio service (GPRS) support node (GGSN) 34, a public switched telephone network (PSTN) 38, and an internet protocol (IP) network 44. Communication system 10 additionally includes a mobile application part (MAP) gateway 50, an authentication, authorization, and accounting (AAA) server 54, a home location register (HLR) 58, a visitor location register (VLR) 60 that may be included within mobile switching center 24, an authentication center 62 that may be included in HLR 58, and a database 64 that may be included in VLR 60.

FIG. 1 may generally be configured or arranged to represent a 2.5G communication architecture applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communication system 10. For example, the present invention may be used in conjunction with a 3G network, where a 3G equivalent of HLR 58 (as well as other additional applicable 3G networking equipment) is provided in the architecture.

According to the teachings of the present invention, communication system 10 operates to provide an authentication protocol that significantly reduces the number of access requests or traffic associated with HLR 58 and authentication center 62. End user 12 is afforded the opportunity to be provided with triplets that are requested by a network and locally cached in a distributed fashion at either AAA server 54 or MAP gateway 50. This is a result of available triplets that are stored in each of these elements and that are able to be provided to end user 12 in order to facilitate a communication session. 'Triplets' generally refers to any data segment or piece of information used in authenticating an entity. The triplets may be any suitable number and reflect authentication credentials where appropriate.

The enhanced architecture as illustrated by FIG. 1 is a result of a caching algorithm that may be implemented in AAA server 54 or MAP gateway 50 or both. Each caching algorithm represents software that dictates what is needed and what can be cached for a given access request. This may be built into remote authentication dial in user service (RADIUS) access request/access accept protocols for an authentication. Such an operation has applications to re-authentication protocols in substantially the same manner. The longer a time duration that the key is held, the more susceptible it may be to security breaches. Keys that are not secured may still be effective but not necessarily so in all applications. Some applications may dictate a preference for low risk and thus require fresh triplets for secured connections. The present invention can accommodate for such a need by including a staleness parameter in the access request, which may be properly accounted for by the algorithms.

Communication system 10 produces a significant improvement in propagation speeds of authentication requests and responses as a result of the ability to cache triplets locally instead of burdening HLR 58 for each authentication request. When a request propagates through AAA server 54 and through MAP gateway 50, significant traffic develops as the request must travel a substantial distance and implicate multiple network components in order to retrieve triplets necessary for a communication session. However, with the use of distributed caching, this problem is resolved by allowing multiple components, such as AAA server 54 and MAP gateway 50, to provide the requisite triplets to end user 12.

The configuration offered by communication system 10 also enhances bandwidth capabilities for an associated network. This is due, in part, to the decreased burden on HLR 58. Thus, HLR 58 is not necessarily implicated in each authentication request, allowing HLR 58 to accommodate additional bandwidth and traffic associated with other components or devices. By properly managing resource allocations in the network, communication system 10 offers the ability to relieve points of congestion across multiple elements in the network. Accordingly, AAA server 54 and MAP gateway 50 may be used to lessen the workload placed on HLR 58 that would otherwise be required to authenticate each end user 12 or object wishing to engage in a communication session. This additionally provides increased flexibility and scalability to an associated network and may be applicable to any IP communications where identification elements are used to effectuate authentication protocols.

End user 12 is an entity, such as a client or customer, wishing to initiate a communication session or data exchange in communication system 10 via any suitable network. End user 12 may operate to use any suitable device for communications in communication system 10. In addition to the example set of devices illustrated in FIG. 1, end user 12 may also initiate a communication using an electronic notebook, any suitable cellular telephone, a standard telephone, or any other suitable device (that may or may not be wireless), component, element, or object capable of initiating voice or data exchanges within communication system 10. The devices illustrated in FIG. 1 may also be inclusive of any suitable interface to the human user or to a computer, such as a display, microphone, keyboard, or other terminal equipment (such as for example an interface to a personal computer or to a facsimile machine in cases where end user 12 is used as a modem). End user 12 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, or script data, or any type of source or object code, or any other suitable information in any appropriate format that may be communicated from one point to another.

Each of the communications devices illustrated in FIG. 1 may include a communications protocol such that devices are provided a platform to communicate with each other. In a particular embodiment of the present invention, this inter-communications feature may be based on Bluetooth technology. Alternatively, any other suitable inter-communications protocol may be implemented in order to allow authentication to occur between devices that may be operated by end user 12. Such inter-communications may include protocols based on infrared technology, tethered cables, specifications based on the IEEE 802.11 standard, or any other suitable communications protocol that allows two or more devices to communicate with each other.

Identification element 16 is a unique identifier that provides a correlation between a source profile and an identity of end user 12. By way of example, FIG. 1 illustrates identification element 16 as residing within PDA 14b. This example is used only for purposes of teaching as identification element 16 may alternatively be positioned in any other device, such as mobile station 14a, laptop 14c, or any other suitable device operable to initiate a communication session in a network environment.

Identification element 16 provides a point of origin designation for a specific request packet propagating through communication system 10. Identification element 16 may be an address element associated with end user 12 in accordance with a particular embodiment of the present invention. However, it is important to note that the authentication mechanism provided in conjunction with identification element 16 may be distinct from addressing as an address may be assigned before or after authentication. Thus, identification element 16 may be any algorithm, object, element, or piece of data that operates to uniquely identify or to distinguish end user 12 that generates a request packet in a network environment. For example, identification element 16 may correlate to a user name or to a phone number or to any other piece of information that operates to distinguish participants in a network. Identification element 16 may serve as a temporary identifier where user-IDs are recycled continuously or the user-ID may serve as a permanent identifier where appropriate and stored in a statically or dynamically configured table in accordance with particular needs.

Identification element 16 is a subscriber identification module (SIM) in a particular embodiment of the present invention. Additionally, certain devices may include multiple SIMs or SIM cards that are suitably provisioned by a designer or manufacturer of the SIM or of the actual component or device. Also, SIMs may be particular to a mobile station or a specific standard. For example, where appropriate, separate SIMs may be provided for voice or data pathways corresponding to multiple SIMs in a single device.

It may be optimal in certain scenarios to position identification element 16 in a device such as mobile station 14a, which provides 'always on' connectivity. Identification element 16 offers great flexibility in that it may be positioned in any suitable location or environment. The SIM may contain an identity of end user 12 with the corresponding code on the SIM and other accompanying mechanisms and suitable elements associated with the SIM allowing end user 12 to communicate securely in a network environment. Accordingly, each time end user 12 initiates a communication, authentication may be executed through the SIM (i.e. identification element 16).

Base transceiver station 18 is a communicative interface that may comprise radio transmission/reception devices, components or objects, and antennas. Base transceiver station 18 may be coupled to any communications device or element, such as mobile station 14a, PDA 14b, or laptop 14c for example. Base transceiver station 18 may also be coupled to base station controller 22 that uses a landline (such as a high-speed T1/E1 line, for example) interface. Base transceiver station 18 may operate as a series of complex radio modems where appropriate. Base transceiver station 18 may also perform transcoding and rate adaptation functions in accordance with particular needs. Transcoding and rate adaptation may also be executed in a GSM environment in suitable hardware (for example in a transcoding and rate adaptation unit (TRAU)) positioned between mobile switching center 24 and base station controller 22.

In operation, base station controller 22 operates as a management component for a radio interface. This management may be executed through remote commands to base transceiver station 18 within communication system 10. Base station controller 22 may manage more than one base transceiver station 18. Some of the responsibilities of base station controller 22 may include management of radio channels. Any number of suitable communications objects or elements may be included within, external to, or coupled to base station controller 22 and base transceiver station 18.

Mobile switching center 24 operates as a interface between PSTN 38 and base station controller 22 and potentially between multiple other mobile switching centers in a network and base station controller 22. Mobile switching center 24 represents a location that generally houses communication switches and computers and ensures that its cell sites in a given geographical area are connected. Cell sites refer generally to the transmission and reception equipment or components, potentially including a number of suitable base stations that connect elements such as mobile station 14a, PDA 14b, or laptop 14c to a network, such as IP network 44 for example. By controlling transmission power and radio frequencies, mobile switching center 24 may monitor the movement and the transfer of a wireless communication from one cell to another cell and from one frequency or channel to another frequency or channel. In a given communication environment, communication system 10 may include multiple mobile switching centers 24 that are operable to facilitate communications between base station controller 22 and PSTN 38. Mobile switching center 24 may also generally handle connection, tracking, status, billing information, and other user information for wireless communications in a designated area. This may include, for example, the fact that end user 12 is assigned certain wireless capabilities or use time, most likely based on a given fee schedule associate with a mobile network.

WLAN element 28 is a wireless protocol that allows end user 12 to connect to a local network through a wireless or a radio connection. Such a protocol may be generally based on the IEEE 802.11 standard or on any other suitable architecture that provides for wireless communications in a network environment. WLAN element 28 as refereed to herein in this document may also be representative of a 'hot spot' or a public WLAN (PWLAN) where appropriate. WLAN element 28 may be deployed in such public places as coffee shops, airports, restaurants, hotels, and conference centers, for example, as a way to provide connectivity to end user 12.

WLAN element 28 may be coupled to each of the devices used by end user 12, such as mobile station 14a, PDA 14b, and laptop 14c for example. WLAN element 28 may also be coupled to IP network 44 and facilitate authentication procedures for end user 12 by communicating with IP network 44. Suitable encryption protocols may be included within a protocol associated with WLAN element 28 where appropriate and according to particular needs.

WLAN element 28 may include termination software, an extensible authentication protocol (EAP), and SIM platforms for facilitating authentication protocols associated with end user 12. The EAP element may operate to send an identity request to a selected device when that device is in an area accessible by communication signals. When the identity request is received, software on the selected device may be accessed and the SIM card identification (or identification element 16) retrieved in order to get an international mobile subscriber identity (IMSI) from the SIM card. The IMSI may be assigned by an operator when the SIM is given to an end user. This represents provisioning of the IMSI. Each IMSI may have a shared-key algorithm that is provisioned in each SIM card and that is also provisioned in authentication center 62.

WLAN element 28 may be inclusive of an access point and an access router operable to facilitate communication sessions, including authentication protocols in designated locations. The access router may aggregate access points within a corresponding hot spot. It may also provide a back haul from the public hot spot location to the corresponding core network whether that core network is reflected by a broker's network or an operator's network. A single or a multiple operator broker network may be accommodated in accordance with the teachings of the present invention. Additionally, a service selection gateway (SSG) may be included in the operator's network where appropriate and in accordance with particular needs.

Data gateway 30 is a communications element that provides access to the internet, intranet, wireless application protocol (WAP) servers, or any other suitable platform, element, or network for communication with a device being used by end user 12. For example, data gateway 30 may be a packet data serving node (PDSN) or, in the case of a GSM environment, data gateway 30 may be a serving GPRS support node (SGSN). Data gateway 30 may provide an access gateway for devices implemented by end user 12 and for IP network 44. Data gateway 30 may further provide foreign agent support and packet transport for virtual private networking or for any other suitable networking configuration where appropriate. Data gateway 30 may also assist in authenticating and authorizing end user 12 before being permitted to communicate in communication system 10. Data gateway 30 may be coupled to base station controller 22 and GGSN 34, or GGSN 34 may be included within data gateway 30 where appropriate.

GGSN 34 is a communications node operating in a GPRS environment that may be working in conjunction with multiple SGSNs, providing a communications medium in a GPRS service network environment in communicating high-speed data exchanges within communication system 10. GGSN 34 may be inclusive of a walled garden (used to grant access or rights to end user 12) or any other suitable mechanism that a network operator may choose to implement in order to provide some connectivity for the network. GPRS represents a packet-based data bearer service for communication services that may be delivered as a network overlay for any type of suitable network configuration or platform. GPRS generally applies packet-radio and packet switching principles to transfer data packets in an efficient way between GSM mobile stations and external packet data networks. Packet switching may occur when data is split into packets that are transmitted separately and then reassembled at a receiving end. GPRS may support multiple internet communication protocols, and may enable existing IP, X.25, or any other suitable applications or platforms to operate over GSM connections.

PSTN 38 represents a worldwide telephone system that is operable to conduct communications between two nodes. PSTN 38 may be any landline telephone network operable to facilitate communications between two entities, such as two persons, a person and a computer, two computers, or in any other environment in which data is exchanged for purposes of communication. According to one embodiment of the present invention, PSTN 38 operates in a wireless domain, facilitating data exchanges between end user 12 and some other entity within or external to communication system 10.

IP network 44 is a series of points or nodes of interconnected communication paths for receiving and transmitting packets of information that propagate through communication system 10. IP network 44 offers a communications interface between WLAN element 28 and any number of selected components within communication system 10. IP network 44 may be any LAN, metropolitan area network (MAN), or wide area network (WAN), or any other appropriate architectural system that facilitates communications in a network environment. IP network 44 implements a transmission control protocol/internet protocol (TCP/IP) communication language protocol in a particular embodiment of the present invention. However, IP network 44 may alternatively implement any other suitable communications protocol for transmitting and receiving data packets within communication system 10.

MAP gateway 50 is a network point or node that operates as a data exchange interface between IP network 44 or AAA server 54 and HLR 58. MAP gateway 50 may also operate as an interface between WLAN element 28 and any number of selected components within communication system 10. In one embodiment of the present invention, MAP gateway 50 includes software operable to receive and respond to a request for triplets. MAP gateway 50 may include a caching algorithm operable to receive a request for triplets and properly respond to that request. If available, MAP gateway 50 may return a proper number of triplets to WLAN element 28 in order to facilitate a communication session. Additional details relating to the internal structure of MAP gateway 50 are provided below with reference to FIG. 2A.

In certain embodiments, MAP gateway 50 may also include suitable conversion elements such as web proxies, content optimization engines, or optimization caches for example, some of which may operate to convert proprietary information into a suitable format to be displayed by a receiving entity or node. MAP gateway 50 may also operate to correlate an entity of end user 12 to a source profile or end user information within the network. Alternatively, MAP gateway 50 may be any server, router, or element operable to facilitate network communications. To SS-7 network 20, MAP gateway 50 may appear as a functional VLR.

AAA server 54 is an element that operates to facilitate the authentication, authorization, and accounting of end user 12 in a network environment. AAA server 54 is a server program that handles requests by end user 12 for access to networking resources. Networking resources refers to any device, component, or element that provides some functionality to end user 12 communicating in communication system 10. For a corresponding network, AAA server 54 may also provide authentication, authorization, and accounting services and management.

Authorization generally refers to the process of giving end user 12 permission to do or to access something. In multi-user computer systems, a system administrator may define for the system which end users are allowed access to given data in the system and what privileges are provided for end user 12. Once end user 12 has logged onto a network, such as for example IP network 44, the network may wish to identify what resources end user 12 is given during the communication session. Thus, authorization within communication system 10 may be seen as both a preliminary setting up of permissions by a system administrator and the actual checking or verification of the permission values that have been set up when end user 12 is attempting access. Authentication generally refers to the process of determining whether end user 12 is in fact who or what it is declared to be. This may be effectuated through identification element 16 (e.g., a SIM or SIM card) that is present in a device or component being operated by end user 12. In the case of private or public computer networks, authentication may be commonly done through the use of unique identification elements or log-on passwords. Knowledge of the password offers a presumption that a given end user is authentic. Accounting generally refers to tracking usage for each end user 12 or each network and may additionally include trafficking information or data relating to other information flows within communication system 10 or within a particular sub-network.

AAA server 54 may receive the IP address or other end user 12 parameters from any suitable source, such as a client aware device or component or a dynamic host configuration protocol (DHCP) server or a domain name system (DNS) database element for example, in order to direct data to be communicated to end user 12. AAA server 54 may include any suitable hardware, software, component, or element that operates to receive data associated with end user 12 and to provide corresponding AAA related functions to network components within communication system 10. Authorization and IP address management may be retrieved by AAA server 54 from a layer two tunneling protocol (L2TP) network server (LNS), which may be provided to address secure services for end user 12 where appropriate. The assigned IP address may be a private or a routable IP address. On assignment of the IP address, the DHCP server may perform update procedures for updating the assigned IP address and the leasing parameters for end user 12 in accordance with particular configurations with the network.

In one embodiment of the present invention, AAA server 54 includes software operable to receive and respond to a request for triplets. AAA server 54 may also initiate the request for triplets and act as the network element in performing authentication of end user 12. AAA server 54 may include a caching algorithm operable to receive a request for triplets and properly respond to that request. If available, AAA server 54 returns a proper number of triplets to WLAN element 28 in order to facilitate a communication session. Additional details relating to the internal structure of AAA server 54 are provided below with reference to FIG. 2A.

In operation, an authentication request may be generated by WLAN element 28 or mobile switching center 24 on behalf of end user 12. The request may propagate over the network in order to access AAA server 54. AAA server 54 may then query its own internal structure in order to determine if it has cached the requested number of triplets locally. In the case where it is able to do so, triplets may be returned to WLAN element 28 in order to facilitate a communication session associated with end user 12. In the case where it cannot, AAA server 54 may forward the request for triplets onto MAP gateway 50, which performs a similar internal referencing protocol in order to satisfy the request.

In the case where MAP gateway 50 can accommodate the request, a suitable number of triplets are returned to WLAN element 28 via AAA server 54 or IP network 44. If it cannot locally respond to the request for triplets from its cache, MAP gateway 50 may query HLR 58 for the requisite number of triplets. Triplets (authentication credentials) caching may occur on the response path. The authentication may be communicated back to the individual device that included identification element 16 or, alternatively, the authentication information may be communicated to any suitable element or component within communication system 10.

HLR 58 represents a storage unit or database of subscriber information relevant to communication services. HLR 58 may store or otherwise maintain information related to parameters associated with end user 12 and may further be potentially independent of the physical location of the subscriber, client, or end user 12. HLR 58 may also include information related to the current location of end user 12 for incoming call-routing purposes. HLR 58 may be coupled to MAP gateway 50 and VLR 60 and provide data relating to the capabilities or the services offered to end user 12 generally based on some potential payment scheme. A functional subdivision of HLR 58 may include authentication center (also commonly referred to as an AuC) 62, the role of which may be the management of security data for the authentication of multiple end users 12 for example. HLR 58 operates to look up a $K_i$ value for a corresponding IMSI and to generate a random number to be positioned in the operator-specific algorithm that produces a response to be later used to verify the SIM is who or what it purports to be. Triplets may then be returned to an access point included within WLAN element 28 or mobile switching center 24. The triplets may be returned via MAP gateway 50 or AAA server 54 and stored at an access point for a later comparison. The triplets may be returned to the network element in control of the authentication procedure, which may be WLAN element 28, mobile switching center 24, or AAA server 54 for example. Thus, authentication time may be improved and hits on HLR 58 may be significantly reduced.

Authentication center 62 may be in communication with a number of remote user locations. Authentication center 62 may also be co-located with a remote user location where appropriate and according to particular needs. In operation, end user 12 seeks to access information across a given network or communications architecture. Before end user 12 is permitted to access a network, end user 12 must be properly authenticated as a valid network user. Authentication information may be stored in HLR 58 of a service provider with which end user 12 has established a service relationship. End user 12 is then properly authorized by its service provider before end user 12 is permitted access to information on a corresponding network. Authentication center 62 may include a piece of code, software, or hardware that is operable to generate triplets for authentication purposes. Authentication center 62 may also include a cryptographic algorithm where appropriate that is provided for an operator to implement for authentication protocols.

It is important to understand some of the interaction provided in a GSM environment. When a network user, such as end user 12, is registered with the GSM network, the user is assigned an IMSI and a key $K_i$. The IMSI, $K_i$, and an authentication algorithm may be stored in the SIM or SIM card. The $K_i$ for a network user may be stored in any suitable location, such as HLR 58 for example, and indexed according to IMSI.

When end user 12 seeks access to a network, end user 12 may communicate an access request to an access point included within WLAN element 28. The access point may then forward the access request to AAA server 54. In one embodiment of the present invention, end user 12 communicates with the access point using the IEEE 802.11 communications format. The access point may then communicate with AAA server 54 across IP network 44. IP network 44 may also implement a user datagram protocol (UDP) to run in conjunction with the IP network. The access point may interface with AAA server 54 using RADIUS communications flows. The RADIUS flows may be implemented with EAP extensions where appropriate. AAA server 54 may communicate with MAP gateway 50 across IP network 44 via UDP over IP and RADIUS along with proprietary vendor specific attributes (VSAs). The access request from AAA server 54 to MAP gateway 50 may include the IMSI, the number of triplets requested, and the staleness parameter of the triplets for example. Alternatively, the access request may include any number of suitable parameters where appropriate and based on particular needs.

MAP gateway 50 may then convert the information received from a RADIUS format to a MAP format. The MAP format may be part of an SS-7 communications protocol used in wireless mobile telephony. MAP gateway 50 may communicate with HLR 58 using the MAP format across SS-7 network 20. When MAP gateway 50 receives MAP-formatted information from HLR 58, it may convert the information into a RADIUS format and communicate it to AAA server 54 across IP network 44.

VLR 60 is a storage element that contains dynamic information about capabilities offered to end user 12. In addition, VLR 60 may include information relating to preferences associated with end user 12 or cache triplets in a GSM environment. VLR 60 and HLR 58 may communicate with each in order to provide mobility to devices being implemented by end user 12. VLR 60 may be included within MSC 24 or within any other suitable device or, alternatively, configured to be its own separate entity where appropriate. VLR 60 may be inclusive of or coupled to database 64, a storage element operable to store any information associated with a communication flow or end user 12. VLR 60 may further include a copy of data stored in HLR 58. Any suitable user profile information may be contained within VLR 60 and the data stored in VLR 60 may be transferred or otherwise communicated to HLR 58, PSTN 38, or base station controller 22 where appropriate.

GSM authentication is generally based on a challenge-response mechanism. For example, the authentication algorithm that is executed on the SIM may be given a 128-bit random number (RAND) as a challenge. The SIM may execute an operator-specific confidential algorithm that takes the RAND and the key $K_i$ stored on the SIM as inputs and produces a 32-bit response (SRES) and a 64-bit key ($K_c$) as output. The network user may communicate the IMSI to VLR 60 or WLAN element 28 when the network user desires to gain network access. The query may be routed by the SS-7 network (based on the IMSI and/or sub-system number (SSN)) to HLR 58 in the case where MAP gateway 50 and AAA server 54 cannot use locally cached triplets for a communication session.

Any suitable element (in succession), such as AAA server 54, MAP gateway 50, or HLR 58, may respond to the authentication query by sending a pre-configured number of authentication triplets. AAA server 54, MAP gateway 50, and HLR 58 may be configured to return 0-5 triplets. Some configurations may only permit a maximum of four triplets to be returned from each access request. The triplets may be based on the $K_i$ that is retrieved using the IMSI. The triplets may also include the RAND, the SRES calculated using $K_i$, and a session key ($K_c$) that is calculated using the $K_i$, the RAND, and a verification algorithm. A match between two SRESs means that end user 12 has been authenticated. Additionally, an algorithm may also be negotiated and used for encryption of an air link using the key $K_c$.

In operation of an example embodiment, an access point included within WLAN 28 may respond to an access request (e.g. a port connect element) by sending an EAP format request identity command to end user 12. The function of this command is to request the identity of a given end user or object. The identity of end user 12 may be recorded as an IMSI or any other element included in identification element 16 or the SIM provided in a corresponding device or component. The SIM may also be referred to as a smart card where appropriate. Identification element 16 makes it possible to identify end user 12 as a legitimate and authorized end user. End user 12 may issue a request IMSI command to a SIM to obtain the IMSI of end user 12. The SIM may respond to the request IMSI command by returning the IMSI of end user 12.

Upon receiving the IMSI from a SIM, end user 12 may then send an EAP-format response identity communication to an access point. The response identity communication may send the IMSI of end user 12 and realm information to AAA server 54 via the access point. The identity of end user 12 may be formatted as IMSI@realm or in any other format according to particular needs. The realm component may be configured by end user 12 to indicate to AAA server 54 that the EAP-SIM is in use.

When the access point receives a response identity communication from end user 12, it may generate an access request message to be sent to AAA server 54. The function of the access request message is to forward the response identity message in a RADIUS format to AAA server 54. The access point may then copy the identity included in the response identity message into a username attribute and forward the information contained in the response identity message to AAA server 54. In addition to the username information in the response identity message, the access request may also include other RADIUS attributes, such as a message authenticator, a NetWare Access Server-Identification (NAS-ID), a service request, or a calling station ID for example. The RADIUS attribute calling station ID may also be referred to as a MAC Address which is the address for a device as it is identified at the Media Access Control (MAC) protocol layer.

Upon receiving the access request message, AAA server 54 may determine if it can process the message, how many triplets are required to authenticate a user, and which of the EAP authentication messages are to be used. AAA server 54 may make that decision based on one or more attributes such as username, NAS-ID, or service type for example. AAA server 54 may generate a RADIUS-format authentication request. The function of the RADIUS-format authentication request may be to obtain authentication triplets.

Communication system 10 may take advantage of one or more features of SS-7 network 20 to avoid wasting triplets generated by authentication center 62. Additional triplets may be stored in VLR 60 and accessed via database 64. VLR 60 may include an IMSI database where appropriate. IMSI represents the address that is assigned to each SIM card, with each SIM card including a unique IMSI. HLR 58 may then use the IMSI to identify a request for authentication triplets for a particular IMSI.

Figure 2A:
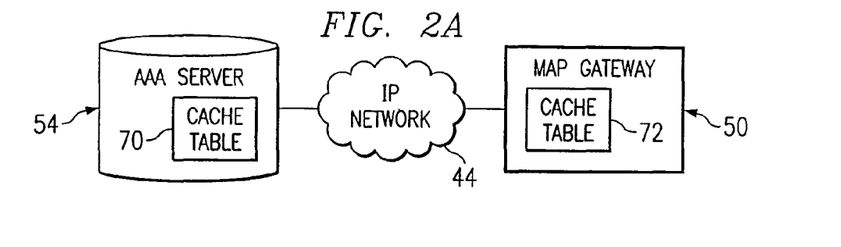
FIG. 2A is a simplified block diagram of an authentication, authorization, and accounting (AAA) server and a mobile application part (MAP) gateway included within the communication system.

FIG. 2A is a simplified diagram of AAA server 54 and MAP gateway 50. A set of cache tables 70 and 72 may be provided to AAA server 54 and MAP gateway 50 in order to facilitate an authentication of end user 12. Cache table 70 and 72 are operable to store triplets that may be cached locally and provided to WLAN element 28 in order to facilitate a communication session. Cache table 70 and cache table 72 may be populated via RADIUS flows that propagate through one or more elements within communication system 10. Each of cache table 70 and 72 may be check pointed, reloaded, primed, maintained, changed, or otherwise managed in any suitable manner in accordance with particular networking or operator needs.

AAA server 54 and MAP gateway 50 may also each include suitable software or one or more algorithms used to process requests for triplets communicated by WLAN element 28. Thus, AAA server 54 or MAP gateway 50 may determine the number of triplets and whether fresh triplets are needed by invoking an algorithm included therein. The algorithm may include parameters for cache size, reused count (number of times that a triplet has been reused), max return, time to live value, how many times the triplets can be used [reuse count], freshness characteristics, or any other suitable parameters or characteristics where appropriate. Generally triplets may be reused if designated so by an operator and may include a standard reuse rate of five in certain applications. (WLAN applications generally require at least two triplets). Control of the algorithms may be given to each element where appropriate, i.e. their operator. Parameters may generally be provisioned properly on both sides, but the present invention may account for other instances that deviate from this where appropriate and based on particular needs. Partial fulfillment of a triplets request may also be accommodated by AAA server 54 or MAP gateway 50. Alternatively, suitable caching algorithms may be implemented at any point in the distributed caching process or at any location of the network. This may be based on security needs of particular end users 12 or operators.

Figure 2B:
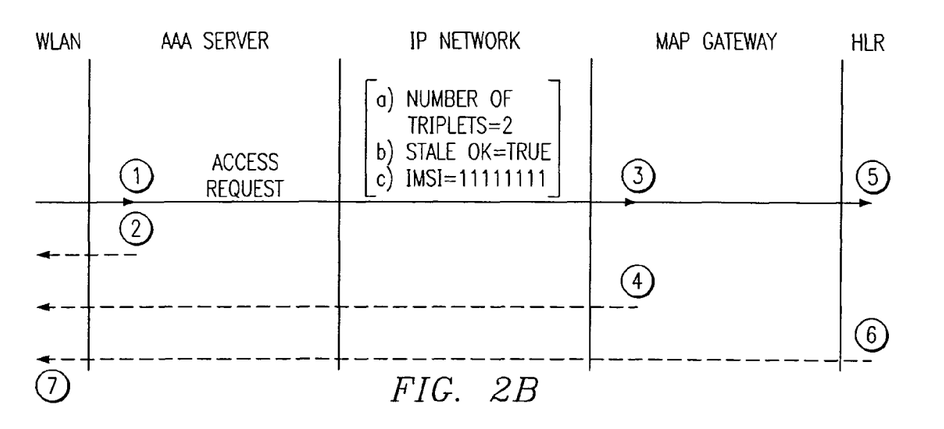
FIG. 2B is a flow diagram illustrating an example interaction between elements in the communication system.

FIG. 2B is a flow diagram illustrating a series of example steps associated with caching triplets locally in communication system 10. The flow begins at step 1 where WLAN element 28 sends a request to AAA server 54 for a requisite number of triplets. As illustrated in FIG. 2B, the access request may include the number of triplets requested, a staleness parameter, and an IMSI value. At step 2, triplets are returned to WLAN element 28 by AAA server 54 in the case where AAA server 54 can accommodate or satisfy the request, i.e. the local cache hit sought on AAA server 54. Cache table 70 may be accessed when an EAP-SIM IMSI request is received.

In the case where AAA server 54 does not have available triplets to be cached (i.e. no entry found or triplet order cannot be filled), AAA server 54 may then communicate an access request to MAP gateway 50 via IP network 44. If MAP gateway 50 can satisfy the request of step 3, it may return a corresponding number of triplets at step 4 to WLAN element 28. The RADIUS access request may be converted into a MAP request for authentication information. In the case where MAP gateway 50 cannot satisfy this request, the access request may be forwarded to HLR 58 at step 5. HLR 58 may then satisfy the request at step 6 and return a provisioned number of triplets to WLAN element 28. If more triplets are needed, additional requests may be communicated to HLR 58. Note that the return of triplets from HLR 58 may be directly to WLAN element 28 such that some of the signaling to MAP gateway 50 is avoided. More direct routing of triplets may be effectuated at any point in process without departing from the teachings of the present invention. Step 7 reflects generally the facilitation of a communication session after end user 12 is properly authenticated.

Figure 3:
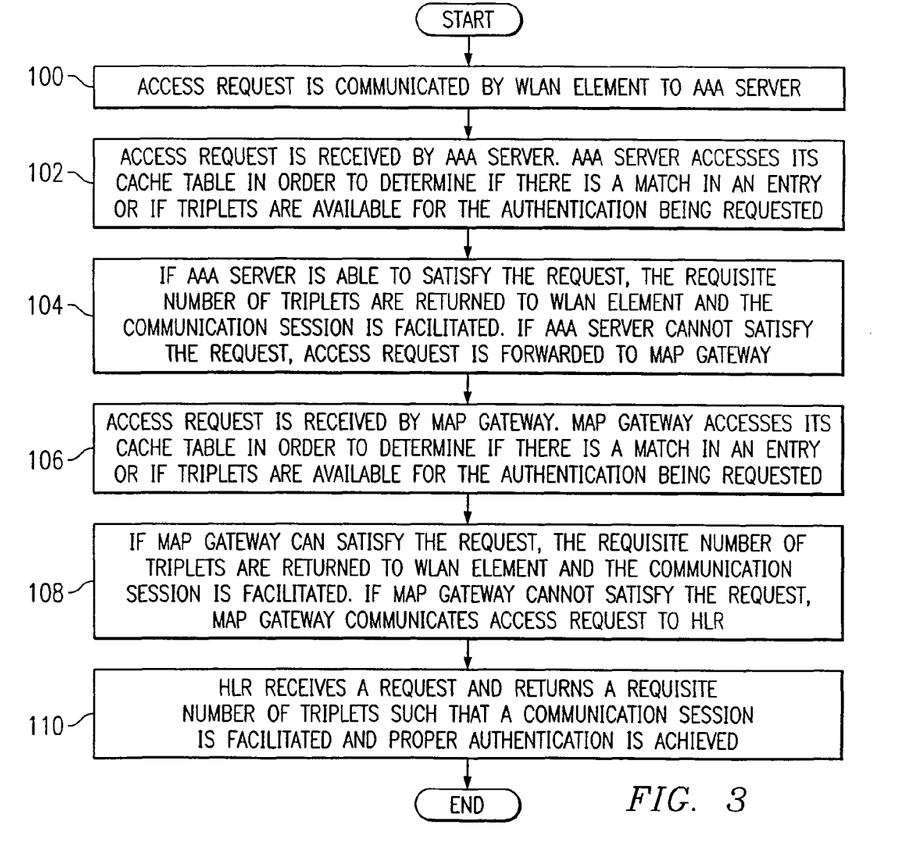
FIG. 3 is a flowchart illustrating a series of example steps associated with a method for authenticating an element in a network environment.

FIG. 3 is flowchart illustrating a series of example steps associated with an authentication protocol executed in a network environment. The method begins at step 100, where an access request is received and forwarded by WLAN element 28 to AAA server 54. At step 102, the access request is received by AAA server 54. AAA server 54 may then access its cache table 70 in order to determine if there is a match in an entry and/or if triplets are available for the authentication being requested. If AAA server 54 is able to satisfy the request, the requisite number of triplets are returned to WLAN element 28 at step 104 and the communication session is facilitated. If AAA server 54 cannot satisfy the request, the access request is forwarded to MAP gateway 50 via IP network 44.

At step 106, MAP gateway 50 may receive the request and access its cache table 72 in order to determine if there is a match in an entry and/or if triplets are available for the authentication being requested. If MAP gateway 50 can satisfy the request, triplets are returned to WLAN element 28 via IP network 44 at step 108. Where MAP gateway 50 cannot satisfy the request, MAP gateway 50 may forward the request to HLR 58. At step 110, HLR 58 receives a request and returns a requisite number of triplets such that a communication session is facilitated and proper authentication is achieved for end user 12 or for any other object seeking to authenticate.

Some of the steps illustrated in FIG. 3 may be changed or deleted where appropriate and additional steps may also be added to the flowchart. These changes may be based on specific communications architectures or particular device configurations and do not depart from the scope or the teachings of the present invention. For example, MAP gateway 50 could be queried first or solely in cases where it is acknowledged that AAA server 54 cannot satisfy a triplets request.

Although the present invention has been described in detail with reference to particular embodiments, it should be understood that various other changes, substitutions, and alterations may be made hereto without departing from the spirit and scope of the present invention. For example, although the present invention has been described with reference to identification element 16 or a SIM, the unique identification feature as described herein may be any suitable object that distinguishes one end user 12 from another. Moreover, such an identification feature may reside in any suitable location within or external to communications system 10. Any number of devices, components or elements (such as IP network 44 for example) may be capable of holding or maintaining the identity or user profile data such that end user 12 may be properly authenticated in an efficient manner.

Moreover, although the present invention has been described with reference to a specific operating architecture or platform, the present invention may be implemented in conjunction with any application seeking to cache information or data locally or in a distributed fashion. For example, MAP gateway 50 may work in international SS-7 networks where appropriate in communicating with multiple networks that are owned by various operators. Thus, caching of an IMSI amongst multiple operators may be accommodated in accordance with the teachings of the present invention. Also, communication system 10 has applications in a 3G environment, with a 3G HLR equivalent being provided in the configuration. Communication system 10 and its teachings enjoy considerable flexibility in their applications in a wide variety of data transmission environments.

Additionally, although communication system 10 has been described in conjunction with RADIUS communication flows, numerous other communication protocols may be implemented without departing from the teachings of the present invention. For example, diameter or terminal access controller access control system (TACACS) protocols may be used in cooperation with the elements of communication system 10 without departing from the scope of the present invention.

Also, although the present invention has been described with reference to a set of triplets that include certain parameters, any suitable parameters may be used in order to perform a proper authentication. The parameters disclosed herein have only been offered for purposes of teaching and example and, where appropriate, may include other elements that operate to facilitate the authentication protocol. For example, doubles or quintuplets may be used where appropriate and in accordance with particular needs.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus comprising:
a mobile application part (MAP) gateway configured to:
cache a plurality of triplets used with an authentication communications protocol to authenticate a communication session;
receive a request for one or more requested triplets, the request sent from a wireless local area network (WLAN) element and forwarded by an authentication, authorization, and accounting (AAA) server;
if the plurality of triplets comprises the one or more requested triplets, return the one or more requested triplets to the WLAN element such that a home location register (HLR) does not provide the one or more requested triplets; and
otherwise, forward the request to the HLR to allow the HLR to provide the one or more requested triplets.

2. The apparatus of claim 1, wherein:
the MAP gateway and the AAA server are connected through an IP network; and
the communication session occurs in a Global System for Mobile (GSM) environment.

3. The apparatus of claim 1, the MAP gateway comprising a caching algorithm comprising:
a first parameter indicating a number of times a parameter can be reused; and
a second parameter indicating a number of times a parameter has been reused.

4. The apparatus of claim 1, the MAP gateway configured to recognize and account for a staleness parameter, which addresses security, in the request.

5. The apparatus of claim 1, the AAA server configured to communicate one or more next triplets the WLAN element in response to a next request for the one or more next triplets.

6. The apparatus of claim 1, the AAA server comprising a cache table configured to store one or more next triplets.

7. The apparatus of claim 1, the MAP gateway configured to cache one or more access requests received by the MAP gateway, the access requests included in one or more RADIUS flows propagating to the MAP gateway.

8. The apparatus of claim 1, the MAP gateway configured to forward the request to the HLR to allow the HLR to verify an identification element included in the request in order to authorize communication of requested triplets.

9. A method comprising:
caching, by a mobile application part (MAP) gateway, a plurality of triplets used with an authentication communications protocol to authenticate a communication session;
receiving a request for one or more requested triplets, the request sent from a wireless local area network (WLAN) element and forwarded by an authentication, authorization, and accounting (AAA) server;
if the plurality of triplets comprises the one or more requested triplets, returning the one or more requested triplets to the WLAN element such that a home location register (HLR) does not provide the one or more requested triplets; and
otherwise, forwarding the request to the HLR to allow the HLR to provide the one or more requested triplets.

10. The method of claim 9, wherein:
the MAP gateway and the AAA server are connected through an IP network; and
the communication session occurs in a Global System for Mobile (GSM) environment.

11. The method of claim 9, the MAP gateway comprising a caching algorithm comprising:
a first parameter indicating a number of times a parameter can be reused; and
a second parameter indicating a number of times a parameter has been reused.

12. The method of claim 9, the MAP gateway configured to recognize and account for a staleness parameter, which addresses security, in the request.

13. The method of claim 9, the AAA server configured to communicate one or more next triplets the WLAN element in response to a next request for the one or more next triplets.

14. The method of claim 9, the AAA server comprising a cache table configured to store one or more next triplets.

15. The method of claim 9, the MAP gateway configured to cache one or more access requests received by the MAP gateway, the access requests included in one or more RADIUS flows propagating to the MAP gateway.

16. The method of claim 9, the MAP gateway configured to forward the request to the HLR to allow the HLR to verify an identification element that is included in the request in order to authorize communication of requested triplets.

* * * * *